United States Patent [19]
Javan et al.

[11] 3,934,212
[45] Jan. 20, 1976

[54] GAS LASER WITH AN AMINE SEED GAS

[75] Inventors: Ali Javan, Cambridge; Jeffrey Steven Levine, Lexington, both of Mass.

[73] Assignee: Massachusetts Institute of Technology, Cambridge, Mass.

[22] Filed: Oct. 24, 1974

[21] Appl. No.: 517,771

Related U.S. Application Data

[63] Continuation-in-part of Ser. No. 335,820, Feb. 26, 1973, abandoned, which is a continuation-in-part of Ser. No. 301,894, Oct. 30, 1972, Pat. No. 3,826,997.

[52] U.S. Cl. ........ 331/94.5 PE; 330/4.3; 331/94.5 G
[51] Int. Cl.$^2$ .......................... H01S 3/22; H01S 3/09
[58] Field of Search ...................... 331/94.5; 330/4.3

[56] References Cited
UNITED STATES PATENTS
3,745,482  7/1973  Patez .............. 331/94.5 G

OTHER PUBLICATIONS
Schriever, *Applied Physics Letters,* 20, (9), p. 354, May 72.
Eletskii et al., *Soviet Physics—Dekkody,* 15, (2), Aug. 70, pp. 109–111.

*Primary Examiner*—Robert J. Webster
*Attorney, Agent, or Firm*—Arthur A. Smith, Jr.; Martin M. Santa; Robert E. Hillman

[57] ABSTRACT

A laser featuring, in one aspect, a volume of gas having a lasing constituent, a light source arranged to emit light having ionizing photons for ionizing the gas, the effective photon energy spectrum of the ionizing photons lying below the ionization potential of the lasing constituent and below the level of photon absorption bands of the gas, the spectrum being selected to provide an average penetration depth of the ionizing photons into the gas of at least 1 cm. and to photoionize the gas predominantly by a multiple step process involving absorption of successive photons at least the first of which has a photon energy less than the ionization potential of said lasing constituent, and an electric field source for applying to the gas a voltage sufficient to produce an avalanche breakdown in the gas to effectively raise the lasing constituent to its lasing level; and in another aspect a seed gas comprising an amine having the structure

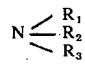

where $R_1$, $R_2$, and $R_3$ represent alkyl groups and in which $R_2$ and $R_3$ may together form a cycloalkyl group, the seed gas having an ionization potential below that of the lasing constituent.

35 Claims, 4 Drawing Figures

GAS LASER WITH AN AMINE SEED GAS

The invention herein described was made in the course of work performed under a contract with the Electronics Systems Division of the Air Force and under a contract with the Office of Naval Research, Department of the Navy.

REFERENCE TO RELATED APPLICATION

This is a continuation-in-part of U.S. patent application Ser. No. 335,820, filed Feb. 26, 1973, now abandoned, which is in turn a continuation-in-part of U.S. patent application Ser. No. 301,894, filed Oct. 30, 1972, now U.S. Pat. No. 3,826,997.

BACKGROUND OF THE INVENTION

This invention relates to lasers (including non-oscillating amplifiers).

In the past, lasing has been produced in gases by application of an electric field at a potential sufficient to produce an avalanche breakdown discharge, thereby generating a plasma by ionization and heating (i.e., raising the mean electron energy) the plasma sufficiently to pump the gas to its lasing level. It has been asserted that discharge uniformity can be improved, and arcing delayed, by use of an auxiliary discharge to create ionization prior to passage of the main current pulse. Preionization with an electron beam is disclosed, e.g. in Garnsworthy et al., Atmospheric-Pressure Pulsed $CO_2$ Laser Utilizing Preionization by High-Energy Electrons, *Applied Physics Letters*, Vol. 19, No. 12, p. 506 (Dec. 15, 1971). Photopreionization (as well as photoionization to help sustain the main discharge) is disclosed, e.g., in Seguin et al., Photoinitiated and Photosustained Laser, *Applied Physics Letters*, Vol. 21, No. 9, p. 414 (Nov. 1, 1972).

Also, recently, a high energy electron beam has been used as an external ionization source to produce a plasma which is then heated by application of a sustaining electric field at below the avalanche breakdown potential. Such a system is described, e.g., in Fenstermacher et al., Electron-Beam-Controlled Electrical Discharge as a Method of Pumping Large Volumes of $CO_2$ Laser Media at High Pressure, *Applied Physics Letters*, Vol. 20, No. 2 (Jan. 15, 1972), pages 56–60, where it is suggested (p. 57) that the plasma might also be produced by an external source of photoionization. Eletskii and Smirnov, A Pulsed Carbon Dioxide Laser, *Soviet Physics*, Vol. 15, No. 2, p. 109 (August, 1970) discloses an attempt to photoionize cesium as a seed gas in a $CO_2$ — $N_2$ — He laser employing a below-breakdown sustaining electric field.

R. L. Schriever, Uniform Direct-Current Discharges in Atmospheric Pressure $He/N_2/CO_2$ Mixtures Using Gas Additives, *Applied Physics Letters*, Vol. 20, No. 9, p. 354 (May, 1972) discloses use of benzene, toluene, xylene, and trimethyl benzene as gas additives in a direct-current discharge He — $N_2$ — $CO_2$ system, and refers to the Eletskii and Smirnov suggestion of cesium as impractical. Seguin, Tulip, and McKen, Enhancement of Photoelectron Density in TEA Lasers Using Additives, *Applied Physics Letters*, Vol. 23, No. 9, p. 529 (Nov. 1, 1973) discusses the use of triethylamine mixed with tripropylamine as a seed gas additive to a spark initiated $CO_2$ laser. A *Semiannual Technical Report* dated December, 1973, by Hughes Research Laboratories, entitled Investigation of UV Photoionization Sustained Discharge for Gas Lasers (covering the reporting period Jan. 2, 1973 – June 30, 1973 under Contract N00014-73-C-0287 sponsored by Advanced Research Projects Agency) discloses the use of tripropylamine as a seed gas in a laser employing a below-breakdown sustaining electric field.

Seguin, Tulip, and McKen, Ultraviolet Photoionization in TEA Lasers, *IEEE Journal of Quantum Electronics*, Vol.QE-10, No.3,p.311 (March, 1974) summarizes much of the previous literature and work.

Applicants' publications Observation of Laser Oscillation in a 1 Atmosphere $CO_2$ — $N_2$ — He Laser Pumped by an Electrically Heated Plasma Generated Via Photoionization, *Applied Physics Letters*, Vol. 22, No. 2 (January, 1973), and The Feasibility of Producing Laser Plasmas Via Photoionization, *IEEE Journal of Quantum Mechanics*, Vol. QE-8, pp. 827–832 (November, 1972), taken together, deal with two-step photoionization, with and without seed gases, in $CO_2$ — $N_2$ — He lasers employing a below-breakdown sustaining electric field, to which invention is directed applicants' U.S. Pat. No. 3,826,997. Tripropylamine, tripentylamine, and tributylamine are disclosed as seed gases.

SUMMARY OF THE INVENTION

The invention provides an improvement in the use of photoionization prior to and (in preferred embodiments) during the laser action, in lasers employing above-breakdown electric fields. Excellent uniformity and stability of the plasma are achieved, eben in very large volume (e.g., 20 liters or more) and high pressure (e.g., multiple atmospheres) lasers, with high efficiency. Rapid pumping (e.g., on a time scale faster than that of plasma production) is made possible. CW operation is possible.

In general the invention features, in one aspect, a laser comprising a volume of gas having a lasing constituent, a light source arranged to emit light having ionizing photons for ionizing the gas, the effective photon energy spectrum of the ionizing photons lying below the ionization potential of the lasing constituent and below the level of photon absorption bands of the gas, the spectrum being selected to provide an average penetration depth of the ionizing photons into the gas of at least 1 cm. and to photoionize the gas predominantly by a multiple step process, and an electric field source for applying to the gas a voltage sufficient to produce an avalanche breakdown in the gas to effectively raise the lasing constituent to its lasing level. In another aspect the invention features ionization of a seed gas comprising an amine having the structure

where $R_1$, $R_2$, and $R_3$ represent alkyl groups and in which $R_2$ and $R_3$ may together from a cycloalkyl group, the seed gas having an ionization potential below that of the lasing constituent. In preferred embodiments the seed gas is tripropylamine, tripentylamine, tributylamine, triethylamine or trimethylamine; a control is provided for delaying the effective application of the voltage so that photoionization of the gas occurs prior to any constricted arc discharge attributable to the voltage; optical means are provided for increasing the flux density of light from the source penetrating limited zones of the volume, the control being arranged to delay the effective application of the voltage to permit diffusion through the volume of the electrons freed in the zones by photoionization; the gas is at least at atmospheric pressure and the seed gas is at a lower partial pressure than the lasing constituent; the voltage is sufficient to produce an avalanche discharge in the gas and there are provided a first chamber within which the voltage is applied to the gas, a second chamber within which the photons are caused to ionize the seed gas, and means for flowing the ionized gas from the second to the first chamber and through the first chamber rapidly enough to prevent constricted arc discharge; the light source is arranged to emit photons having an energy spectrum selected so that the average penetration depth of the ionizing photons is at least 1 meter, and to continue to emit the light after the effective application of the voltage; means are provided to pulse the light source and the electric field source rapidly enough to avoid constricted arc discharge and to replenish the plasma population more rapidly than the lifetime of the radiating state of the lasing constituent; and optical means define an optical path for the light within the volume in which the lasing occurs, the path progressing along the optical axis of the laser, and opposing mirrors are provided for operating in an oscillating mode, one of the mirrors being of dielectrically coated quartz and hence transmissive of light from the source but reflective of light at the laser frequency.

Other advantages and features of the invention will be apparent from the description and drawings herein of preferred embodiments thereof.

DESCRIPTION OF PREFERRED EMBODIMENTS

Figure 1:
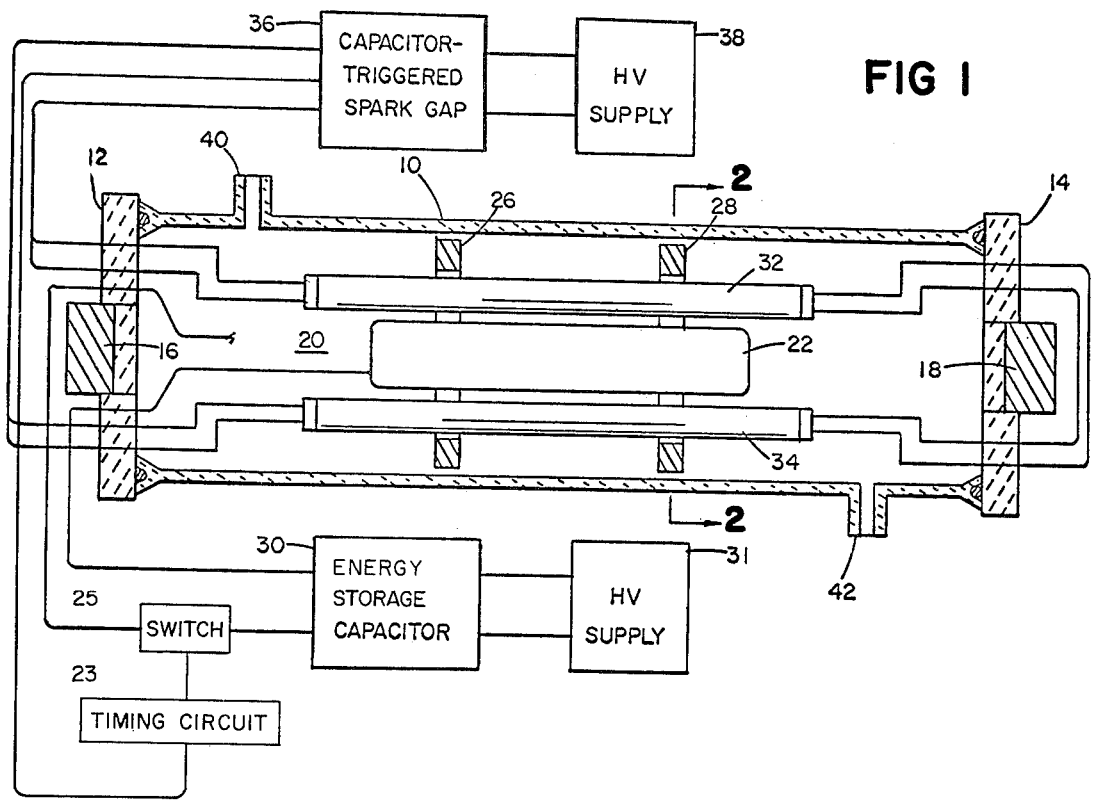
FIG. 1 is a somewhat schematic sectional view of a laser embodying the invention.

Referring to the drawings, a glass tube 10 is vacuum sealed at its ends by plates 12, 14, which respectively support gold coated mirror 16 (99% reflective; 0% transmissive) and germanium mirror 18 (90% reflective, 10% transmissive), both curved with 2 meter radii, thereby defining an optical cavity 20.

Parallel, polished, chrome plated, aluminum electrodes 22 and 24 are supported in the cavity by phenolic rings 26 and 28, and are connected through plate 12 to capacitor 30 fed by high voltage power supply 31.

Xenon flashlamps 32 and 34 are mounted along the edges of the inter-electrode volume, and are connected to capacitor triggered spark gap 36 fed by high voltage power supply 38. The lamps have 1 mm thick, 9.5 mm O.D. quartz envelopes (not transmissive to light of wavelength shorter than about 1650A).

In one example of operation, a 1:2:3 (partial pressure ratio) mixture of $CO_2$, $N_2$, and He at a total pressure of 760 torr, seeded with a small concentration of tri-n-propyl amine at about 0.25 torr partial pressure, is flowed slowly through tube 10, using gas inlet 40 and outlet 42. The flashlamps are energized with approximately 200 joules, illuminating the inter-electrode volume to photoionize the seed gas. An electric field at voltage (e.g., 10,000 volts) sufficient to produce an avalanche discharge, with resulting laser action, is applied between electrodes 22 and 24. Timing circuit 23 is connected between spark gap 36 and switch 25 in series with capacitor 30, and acts to prevent effective application of the voltage to the gas at least until the desired penetration of photons into the gas occurs.

The resulting volumetrically uniform photo-preionization provides a highly uniform plasma and, upon application of the breakdown voltage, desirably delays formation of a constricted arc. Continuation of the photon supply through at least a portion of the avalanche discharge and laser action contributes further to uniformity and stability.

The spectral energy distribution of light from the flashlamps is such that photoionization of the tri-n-propyl amine occurs predominantly by a two-step process involving absorption of successive photons at least the first of which has an energy below the ionization potential (7.23 eV above ground state) of the seed gas.

The invention makes possible production of a plasma with photons well below the energy level required to directly ionize the $CO_2$ lasing medium, which would require photon wavelengths shorter than 900 A. The low partial pressure of the seed gas and the low energy level (compared with the relatively high-lying photon absorption bands and ionization potential of all other constituents) of the ionizing photons result in very long (e.g., upwards of a meter, and in any event at least a centimeter) penetration depths for the ionizing photons, making possible a uniform, efficient photoionization over a large volume. By contrast, efforts to directly ionize $CO_2$ with light of wavelength shorter than 900 A would be impeded by the difficulty of finding windows transmissive to that light, absorption in the outer gas layer due to the high photoionization cross-section of $CO_2$ and its elevated pressure, and other absorption processes such as those arising from the strong absorption bands due to the $N_2$ molecules.

In other examples the $CO_2$ — $N_2$ — He laser has been operated with other tertiary alkyl amines as seed gases, such as tributylamine, tripentylamine, triethylamine, or trimethylamine.

In general, the seed gas should be selected from the class of amines having the structure

where $R_1$, $R_2$, and $R_3$ represent alkyl groups and in which $R_2$ and $R_3$ may together form a cycloalkyl group. The seed gas should preferably have at least 0.01 torr vapor pressure at the operating temperature of the laser (and $R_1$, $R_2$, and $R_3$ should preferably each have no more than 20 carbon atoms (most preferably less than 8–10 carbon atoms)), to facilitate mixing with the lasing medium.

The energy levels of the seed gas should differ from the upper lasing level of the lasing gas by more than the average thermal energy of a gas molecule, to avoid quenching of the upper level (though it may be advantageous to quench the lower laser level through coincidence of that level with an energy level of the seed gas, contributing to population inversion). Similarly, quenching of excitation of an intermediate gas (e.g., $N_2$ in the $CO_2$ laser) should be avoided. Furthermore, the seed gas should not have a strong absorption band at the laser output frequency and should have sufficient vapor pressure at the normal operating temperature of the lasing medium to facilitate mixing with the lasing medium (though heated embodiments are possible). Finally, the seed gas should be stable, non-corrosive, and non-reactive with the other gases in the laser.

Figure 2:
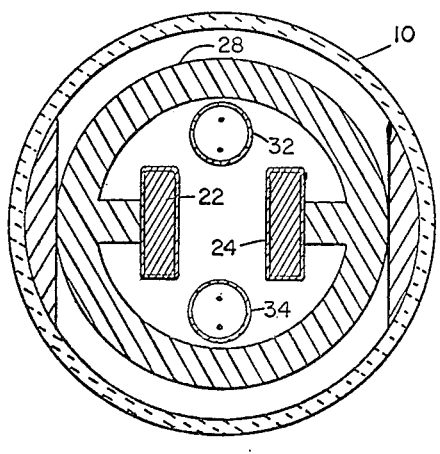
FIG. 2 is a sectional view taken along 2—2 of FIG. 1.

Photoionization of the seed gas by a one step process involving absorption of a single photon can be achieved by using sufficiently energetic photons in a laser system in which the lasing and intermediate gases do not have photon absorption bands which will absorb the ionizing photons. For example, one-step ionization of the tertiary amine seed gases of the invention may be achieved in a $CO - N_2$ laser, since the absorption bands of CO and $N_2$ are well above the ionization potentials of those seed gases. For improved efficiency the $CO - N_2$ laser should operate at cryogenic temperatures. To facilitate introduction of the seed gas, inlet 40 and outlet 42 may be located so that a −77°C to −180°C mixture of CO and N flows between electrodes 22 and 24 at 90° to the optical axis of the laser (i.e., the gas flows vertically as seen in FIG. 2), and a room temperature mixture of N and seed gas is injected into the main gas stream through nozzles located just upstream of the electrodes (i.e., just above the electrodes as seen in FIG. 2). The seed gas will form clusters as it exits from the nozzles, and with suitably high flow rates the clusters will remain small enough during their residence time between the electrodes to provide the desired ionization.

The two (or more) step process may be used to photoionize the lasing medium itself, dispensing with the seed gas. Those gas molecules which, having absorbed at least one photon in a first transition, are ready to be ionized upon absorption of an additional photon, will be distributed throughout the remaining gas volume in much the manner of a low partial pressure, low ionization potential seed gas. In general the two-step process should utilize a weakly allowed transition for the first step to improve penetration depth, "weakly allowed" being defined here in the sense of giving a photon mean penetration depth greater than the corresponding dimension of the desired plasma.

Figure 3:
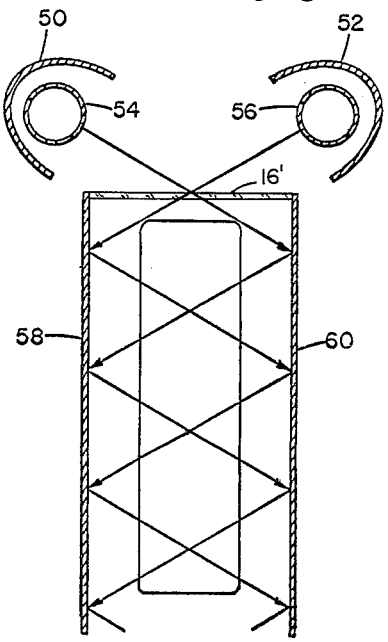
FIG. 3 is a schematic diagram illustrating scale up of the embodiment of FIG. 1.

A scaled-up system of larger volume and higher efficiency, utilizing more of the penetration depth of the photons, is illustrated schematically in FIG. 3. Parabolic mirrors 50, 52 collimate the light from the flashtubes 54, 56, and mirrors 58 and 60 direct and redirect the collimated light within the inter-electrode volume so that it progresses axially along the optical axis of the laser. Mirror 16' in this embodiment is of quartz, coated dielectrically to be transmissive of light from tubes 54, 56, but reflective of light at the laser frequency.

Advantageously, in two-step ionization embodiments, mirrors 50 and 52 reflect narrow beams of greatly increased light flux into the laser volume, the beams passing through only limited zones in that volume. Timing circuit 23 is adjusted to provide a delay long enough (at least a microsecond) to allow two-step ionization to occur and to allow the resulting plasma (initially non-uniformly distributed) to diffuse throughout the laser volume to approximate uniformity, but not so long as to allow excessive plasma loss through the walls of tube 10. Because of the two-step nature of the photoionization, the plasma density is proportional to the square of the flux density; as a result, the focusing of the light beams to increase flux density, followed by delay for diffusion, greatly increases the efficiency of the plasma production.

CW operation can be achieved by pulsing both the light source and the electric field source rapidly enough to prevent constricted arc discharge and to replenish the plasma population more rapidly than the lifetime of the radiating state of the $CO_2$.

The invention is also useful for producing very fast pumping, on a time scale faster than that of plasma production, since the photoionized plasma may be produced fully prior to the application of the pumping voltage.

Figure 4:
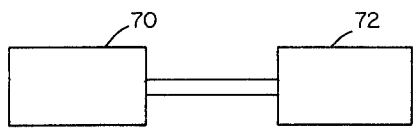
FIG. 4 is a schematic diagram of another embodiment.

In the embodiment of FIG. 4 photoionization occurs in chamber 70, and the ionized gas is flowed rapidly through chamber 72 where the pumping voltage is applied. The chamber transfer inherently provides a delay between ionization and pumping, e.g., to permit diffusion following a flux density-increasing light focusing. Preferably a weak voltage is applied in chamber 70, and in the passage between chambers, to retard electron loss by electron attachment. CW operation may be achieved by flowing the gas through that chamber rapidly enough (e.g., supersonically) to prevent constricted arc formation.

In the various embodiments described the voltage may be kept below the breakdown voltage and thus be used only to heat the plasma (produced by photoionization) to its lasing level, rather than to produce an avalanche discharge. In such embodiments voltage appication is advantageously delayed to permit diffusion of an initially non-uniform plasma, or to permit rapid pumping on a time scale faster than that of plasma production.

Other embodiments are within the following claims.

What is claimed is:

1. A laser comprising:
   a volume of gas having a lasing constituent and a seed gas distributed throughout said lasing constituent, said seed gas comprising an amine having the structure

where $R_1$, $R_2$, and $R_3$ represent alkyl groups and in which $R_2$ and $R_3$ may together form a cycloalkyl group, said seed gas having an ionization potential below that of said lasing constituent,
   a light source arranged to emit light having ionizing photons for ionizing said seed gas, the effective photon energy spectrum of said ionizing photons lying below the ionization potential of said lasing constituent and below the level of photon absorption bands of said gas, said spectrum being selected to provide an average penetration depth of said ionizing photons into said gas of at least 1 cm., and
   means comprising an electric field source for applying to said gas a voltage to produce a plasma energized to create a population inversion in said lasing constituent, and,
   means for stimulating the emission of coherent radiation therein.

2. The laser of claim 1 wherein said voltage is sufficient to produce an avalanche breakdown in said gas.

3. The laser of claim 1 wherein said light source is arranged to emit photons having an energy spectrum selected so that said average penetration depth of said ionizing photons is at least 1 meter.

4. The laser of claim 1 further comprising a control for delaying the effective application of said voltage until not earlier than the penetration of said photons into said gas to said average depth.

5. The laser of claim 4 further comprising optical means for increasing the flux density of light from said source penetrating limited zones of said volume, said control being arranged to delay the effective application of said voltage to permit diffusion through said volume of the electrons freed in said zones by photoionization.

6. The laser of claim 4 wherein said voltage is sufficient to produce an avalanche breakdown in said gas, and said control is arranged so that photoionization of said gas occurs prior to any constricted arc discharge attributable to said voltage.

7. The laser of claim 1 wherein said light source is arranged to continue to emit said light after the effective application of said voltage.

8. The laser of claim 1 wherein said seed gas is tripropylamine.

9. The laser of claim 1 wherein said seed gas is at a lower partial pressure than said lasing constituent.

10. The laser of claim 1 wherein said spectrum has a distribution predetermined to photoionize said seed gas predominantly by a multiple step process involving absorption of successive photons at least the first of which has a photon energy less than the ionization potential of said seed gas.

11. The laser of claim 1 wherein said ionizing photons have an energy level sufficiently high to ionize said seed gas predominately by a one step process involving absorption of a single photon, but low enough to avoid photon absorption bands of said gas.

12. The laser of claim 11 wherein said lasing constituent is CO.

13. The laser of claim 1 wherein said gas is at least at atmospheric pressure.

14. The laser of claim 1 further comprising optical means defining an optical path for said light within the volume in which lasing occurs, said path progressing along the optical axis of said laser.

15. The laser of claim 1 comprising a first chamber within which said voltage is applied to said gas, a second chamber within which said photons are caused to ionize said seed gas, and means for flowing said ionized gas from said second to said first chamber.

16. The laser of claim 4 wherein said delay is at least 1 microsecond.

17. The laser of claim 15 wherein said voltage is sufficient to produce an avalanche discharge in said gas and means are provided for flowing said gas through said first chamber rapidly enough to prevent constricted arc discharge.

18. The laser of claim 2 wherein means are provided to pulse said light source and said electric field source rapidly enough to avoid constricted arc discharge and to replenish the plasma population more rapidly than the lifetime of the radiating state of said lasing constituent.

19. The laser of claim 1 comprising optical means defining an optical path for said light within the volume in which said lasing occurs, said path progressing along the optical axis of said laser, and opposing mirrors in said volume for operation in an oscillating mode, one of said mirrors being transmissive of light from said source but reflective of light at the laser frequency.

20. The laser of claim 19 wherein said mirror is dielectrically coated quartz.

21. The laser of claim 1 wherein said seed gas is tripentylamine.

22. A method of stimulating emission of coherent radiation in a gas having a lasing constituent and a seed gas distributed throughout said lasing constituent, comprising the steps of directing at said gas light having ionizing photons for ionizing said seed gas, the effective photon energy spectrum of said ionizing photons lying below the ionization potential of said lasing constituent and below the level of photon absorption bands of gas, said spectrum being selected to provide an average penetration depth of said ionizing photons into said gas of at least 1 cm., applying to said gas a voltage to produce a plasma energized to create a population inversion in said lasing constituent and, stimulating emission of coherent radiation therein, said seed gas comprising an amine having the structure

where $R_1$, $R_2$, and $R_3$ represent alkyl groups and in which $R_2$ and $R_3$ may together form a cycloalkyl group, said seed gas having an ionization potential below that of said lasing constituent.

23. The laser of claim 22 wherein said voltage is sufficient to produce an avalanche breakdown in said gas.

24. The laser of claim 1 wherein said seed gas is tributylamine.

25. The laser of claim 1 wherein said seed gas is triethylamine.

26. The laser of claim 1 wherein said seed gas is trimethylamine.

27. The laser of claim 23 further comprising delaying the effective application of said voltage so that photoionization of said gas occurs prior to any constricted arc discharge attributable to said voltage.

28. The laser of claim 22 further comprising increasing the flux density of light from said source penetrating limited zones of said volume, and delaying the effective application of said voltage to permit diffusion through said volume of the electrons freed in said zones by photoionization.

29. The laser of claim 22 wherein said seed gas is tripropylamine.

30. The laser of claim 22 wherein said spectrum has a distribution predetermined to photoionize said seed gas predominantly by a multiple step process involving absorption of successive photons at least the first of which has a photon energy less than the ionization potential of said seed gas.

31. The laser of claim 22 wherein said ionizing photons have an energy level sufficiently high to ionize said seed gas predominately by a one step process involving absorption of a single photon, but low enough to avoid photon absorption bands of said gas.

32. The laser of claim 22 wherein said seed gas is tripentylamine.

33. The laser of claim 22 wherein said seed gas is tributylamine.

34. The laser of claim 22 wherein said seed gas is triethylamine.

35. The laser of claim 22 wherein said seed gas is trimethylamine.

* * * * *